R. MARTIN.
Steam-Packing.

No. 210,868. Patented Dec. 17, 1878.

Witnesses
W. L. Bennett.
Anna M. Austin.

Inventor:
Richard Martin
By Thos. S. Cow
Atty

UNITED STATES PATENT OFFICE.

RICHARD MARTIN, OF BROOKLYN, NEW YORK.

IMPROVEMENT IN STEAM-PACKINGS.

Specification forming part of Letters Patent No. 210,868, dated December 17, 1878; application filed October 18, 1878.

*To all whom it may concern:*

Be it known that I, RICHARD MARTIN, of Brooklyn, in the county of Kings and State of New York, have invented certain Improvements in Steam-Packings, of which the following is a specification:

This invention is designed to furnish a new and desirable combination of a metallic surface with a vegetable or partly vegetable packing, by which combination friction will be reduced, and at the same time the advantages of a fibrous packing realized and other benefits gained.

Said invention consists of a fibrous or vegetable packing-ring, having a foraminous sheet-metal lining extending partly, but not wholly, through it, substantially as hereinafter more fully set forth.

Figure 4:
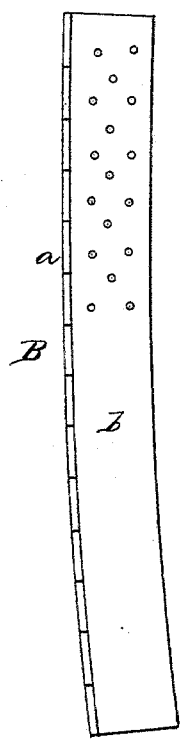
Figure 1:
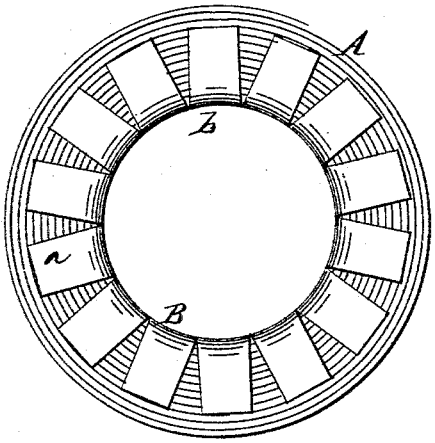
Figure 3:
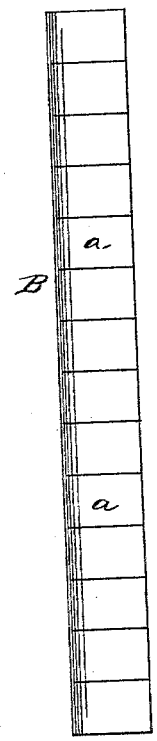
Figure 2:
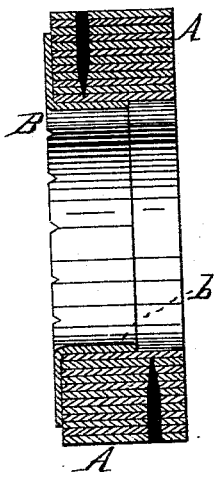

Referring to the accompanying drawings, Figure 1 is an end view of a packing constructed according to my invention. Fig. 2 is a vertical section of the same on a plane at right angles to Fig. 1, the perforations in the sheet-metal lining being omitted in this figure. Fig. 3 shows a section of the anti-friction metal prepared for insertion in the packing. Fig. 4 is another view of the same, showing it on a plane at right angles to Fig. 3, and also samples of the perforations made in the sheet-metal lining.

A is a fibrous or vegetable packing, which may be either a common fibrous packing, an ordinary india-rubber packing made of vulcanized india-rubber combined with cloth or some suitable fibrous substance, or a packing made of textile fabric and wire. In either case the packing is made up for use in the ordinary manner.

B is a strip of metal, a soft anti-friction metal being preferred, a portion of which is cut into lips $a$, to rest upon the face of the fibrous or vegetable packing, and the other portion is adapted to be formed into a ring, as shown at $b$, which ring is inserted inside of the vegetable or fibrous packing.

The ring $b$ should preferably be made of some soft anti-friction metal, and should extend one-half of the way, or perhaps a trifle more, through the vegetable or fibrous packing-ring A, as shown in Fig. 2, the object of the metallic ring $b$ being to furnish an anti-friction metallic surface for the piston-rod or other mechanical device to slide or turn in or upon, and which shall be kept to its place and work by the elasticity of the main packing, while the lips $a\ a$ prevent the ring $b$ from getting out of place.

The ring $b$, extending through only a portion of the packing, allows the heel of the packing, so to speak, to be closed around the piston-rod or other mechanism to be packed, so as to form a perfectly tight joint around such piston-rod or other mechanism, and stop any leak which might by any possibility result from any opening or imperfect joint which might occur from the ends of the soft metal not being fitted to each other perfectly steamtight, or which might in any contingency happen from other causes. This lining $b$ is perforated with small holes, as illustrated in Fig. 4, thus giving a foraminous sheet-metal lining, through which oil may freely pass from the fibrous packing to the piston-rod.

Experience has demonstrated that while a vegetable or fibrous substance is desirable in a steam-packing for packing piston-rods, pump-rods, propeller-shafts, and like devices, on account of its elasticity and consequent adaptability to the surfaces to be packed, a metallic surface to such packing is also quite desirable on account of its more kindly action upon moving metallic surfaces, particularly those of steel or iron rods or shafts.

The present invention affords the benefits of both these excellencies in a superior degree, and at trifling cost, as the ring of soft anti-friction metal, made foraminous as described, behaves most satisfactorily on the rods or other surfaces to be packed, and the other portion of the packing not only holds this soft metal to its work, but also closes behind it, as already described, to prevent any possible escape of steam.

The anti-friction metal can also be furnished in strips of the proper thickness and of any length required, in the form shown in Figs. 3 and 4.

I claim as my invention—

As a new article of manufacture, the fibrous or vegetable packing hereinbefore described, having a foraminous sheet-metal lining extending partly, but not wholly, through it, substantially as hereinbefore set forth.

RICHARD MARTIN.

Witnesses:
   ANNA M. AUSTIN,
   THOS. P. HOW.